United States Patent
Hsu

(10) Patent No.: US 7,857,634 B2
(45) Date of Patent: Dec. 28, 2010

(54) SOCKET CONNECTOR HAVING POSITIONING MEMBERS SEVERING AS POISONING MEMBERS FOR ELECTRONIC DEVICE

(75) Inventor: Shuo-Hsiu Hsu, Tu-Cheng (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 12/634,572

(22) Filed: Dec. 9, 2009

(65) Prior Publication Data

US 2010/0142895 A1 Jun. 10, 2010

(30) Foreign Application Priority Data

Dec. 9, 2008 (TW) ................................. 97222033

(51) Int. Cl.
*H01R 12/00* (2006.01)
(52) U.S. Cl. ....................................................... 439/71
(58) Field of Classification Search .................. 439/71, 439/331, 570, 569, 660
See application file for complete search history.

(56) References Cited

U.S. PATENT DOCUMENTS

| | | | |
|---|---|---|---|
| 4,648,666 A * | 3/1987 | Lovell | 439/71 |
| 5,360,353 A * | 11/1994 | Kinoshita | 439/620.09 |
| 6,908,316 B2 | 6/2005 | Ma et al. | |
| 7,559,784 B2 * | 7/2009 | Hsiao et al. | 439/331 |
| 2006/0216996 A1 * | 9/2006 | Chen | 439/607 |

* cited by examiner

*Primary Examiner*—Phuong K Dinh
(74) *Attorney, Agent, or Firm*—Andrew C. Cheng; Wei Te Chung; Ming Chieh Chang

(57) ABSTRACT

A socket connector for receiving an electronic device includes an insulative housing having a base and a pair of sidewalls located at opposite sides of the base, a plurality of contacts retained in the base, and at least one positioning member attached to the sidewall. The base and the sidewalls jointly define a receiving space for the electronic device. The positioning member includes a soldering section capable of being soldered onto a printed circuit board on which the insulative housing is mounted, and a positioning section protruding into the receiving space and capable of positioning the electronic device.

2 Claims, 6 Drawing Sheets

SOCKET CONNECTOR HAVING POSITIONING MEMBERS SEVERING AS POISONING MEMBERS FOR ELECTRONIC DEVICE

CROSS-REFERENCE TO RELATED APPLICATIONS

This application is related to U.S. application Ser. No. 12/549,395, filed on Aug. 28, 2009, entitled "Socket connector Having Datum Block Facilitating Precise Alignment", which is hereby incorporated by reference in its entirety.

BACKGROUND OF THE INVENTION

1. Field of the Invention

The present invention relates to a socket connector, and more particularly to an optoelectronic (OE) socket connector incorporated with a plurality of positioning members working for securing the OE socket connector onto a printed circuit board as well as an OE module disposed therein.

2. Description of Prior Art

U.S. Pat. No. 6,908,316 issued to Hao-Yun Ma on Jun. 21, 2005 discloses a socket connector for receiving an electronic device. The connector according to Ma includes an insulative housing with a plurality of terminals received therein. The electronic device is placed upon the housing and then comes to contact with the terminals so as to make electrical connection with the connector. The housing has four sidewalls each formed with at least one protrusion integrally extended therefrom. When the electronic device is disposed at proper position of the housing, the protrusions abut against edges of the electronic device so that the electronic device is securely positioned on the housing.

However, the protrusion of the housing is made from plastic material and can be readily scratched and damaged by the OE module disposed therein rendering the OE socket malfunctional.

SUMMARY OF THE INVENTION

It is therefore the object of the present invention to provide a socket connector having robust and reliable positioning members for an electronic device.

In accordance with the present invention, a socket connector for receiving an electronic device is provided, which includes an insulative housing having a base and a pair of sidewalls located at opposite sides of the base, a plurality of contacts retained in the base, and at least one positioning member attached to the sidewall. The base and the sidewalls jointly define a receiving space for the electronic device. The positioning member includes a soldering section capable of being soldered onto a printed circuit board on which the insulative housing is mounted, and a positioning section protruding into the receiving space and capable of positioning the electronic device.

BRIEF DESCRIPTION OF THE DRAWINGS

Other objects, advantages and novel features of the present invention will become more apparent from the following detailed description when taken in conjunction with the accompanying drawings, in which.

DETAILED DESCRIPTION OF PREFERRED EMBODIMENT

Figure 1:
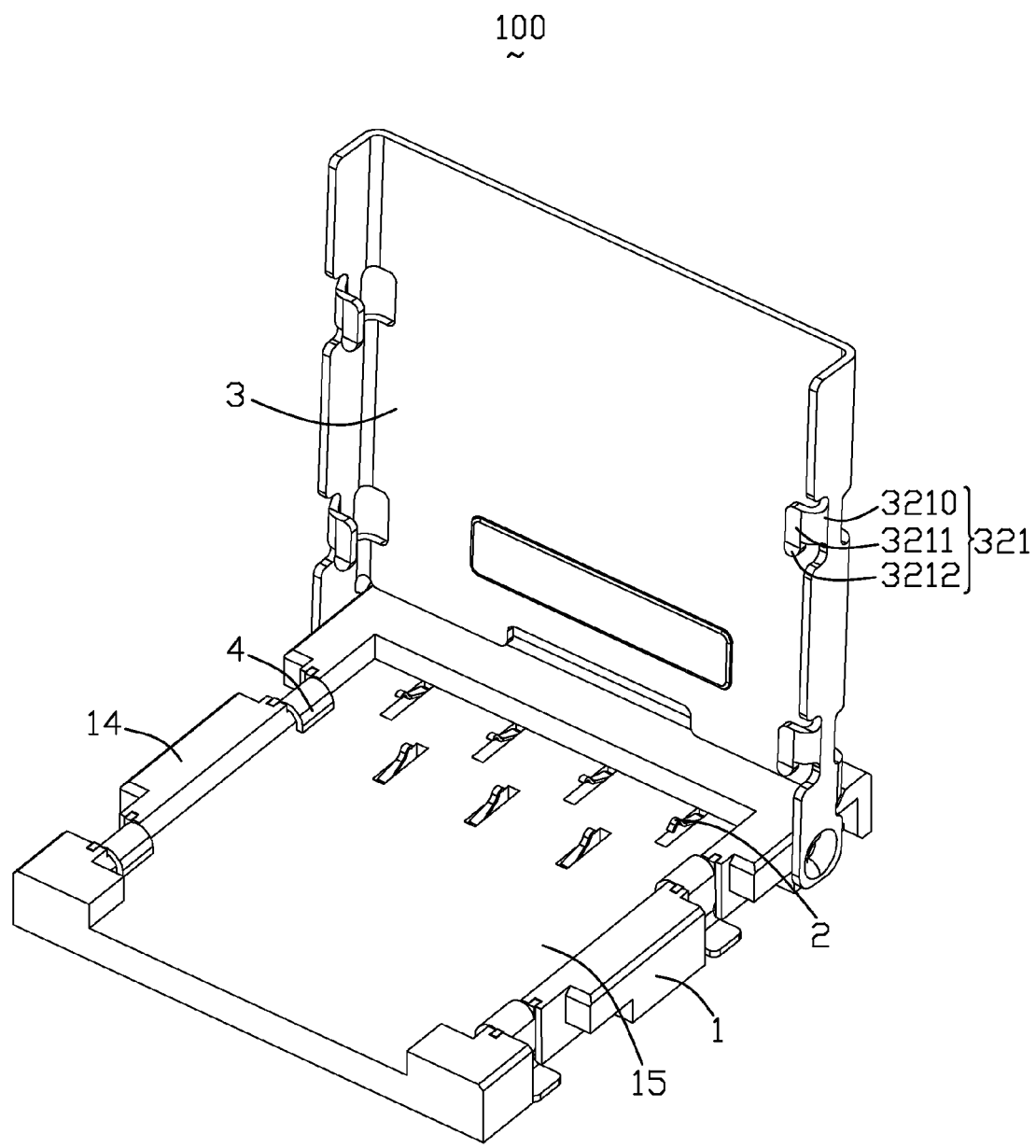
FIG. 1 is an assembled, perspective view of a socket connector in accordance with a preferred embodiment of the present invention, wherein a cover thereof is disposed in an opened position.
Figure 2:
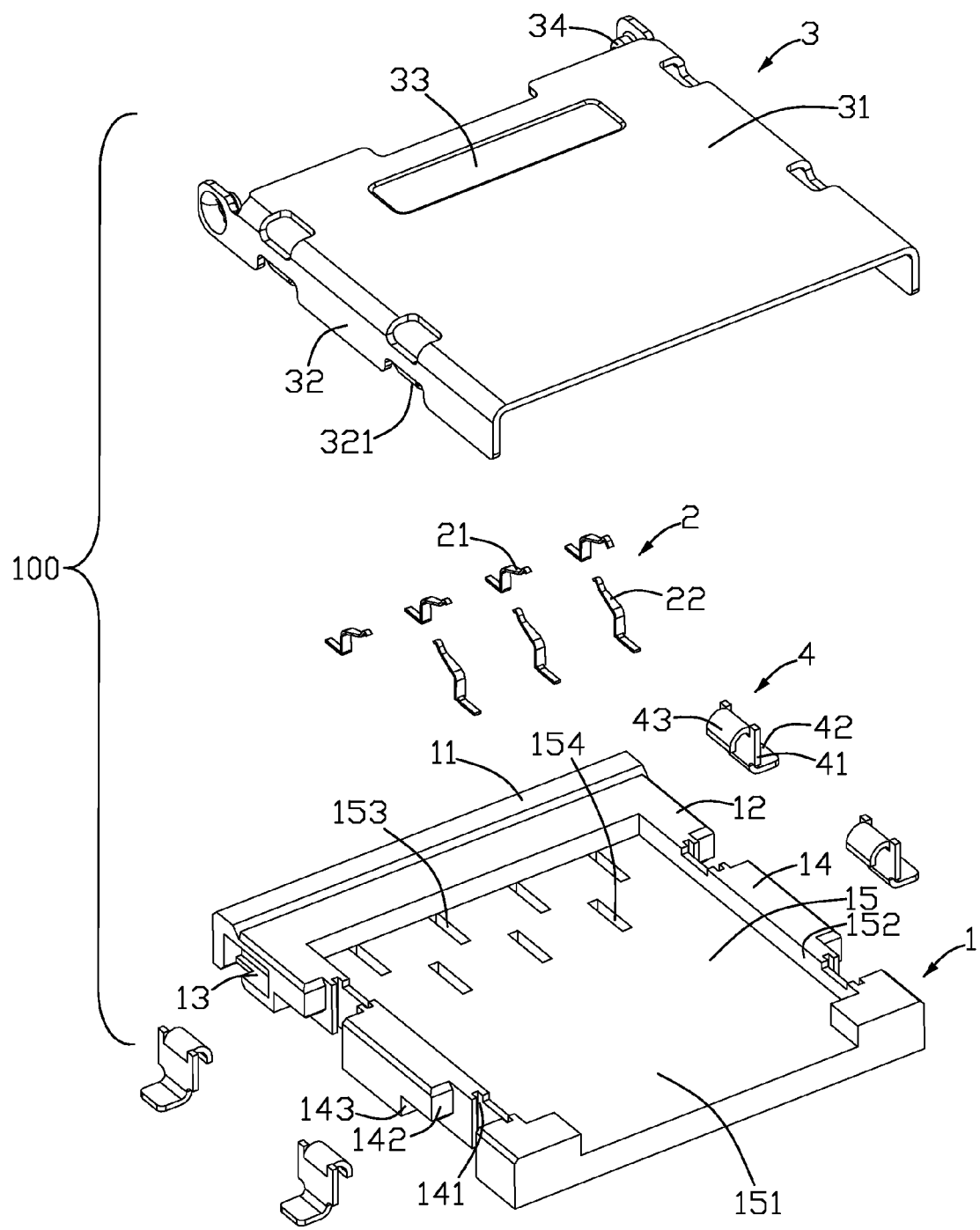
FIG. 2 is an exploded, perspective view of the socket connector in accordance with the preferred embodiment of the present invention.
Figure 3:
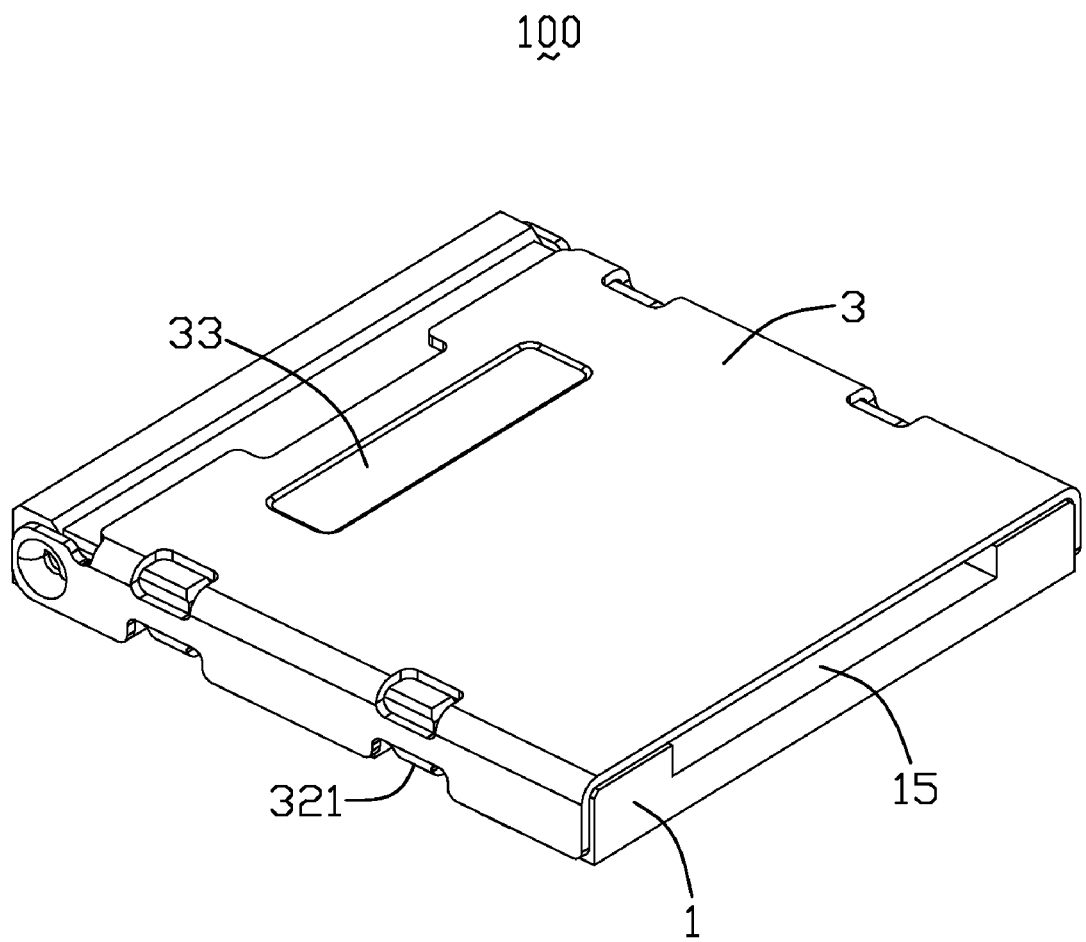
FIG. 3 is an assembled, perspective view of a socket connector in accordance with the preferred embodiment of the present invention, wherein the cover thereof is disposed in a closed position.
Figure 4:
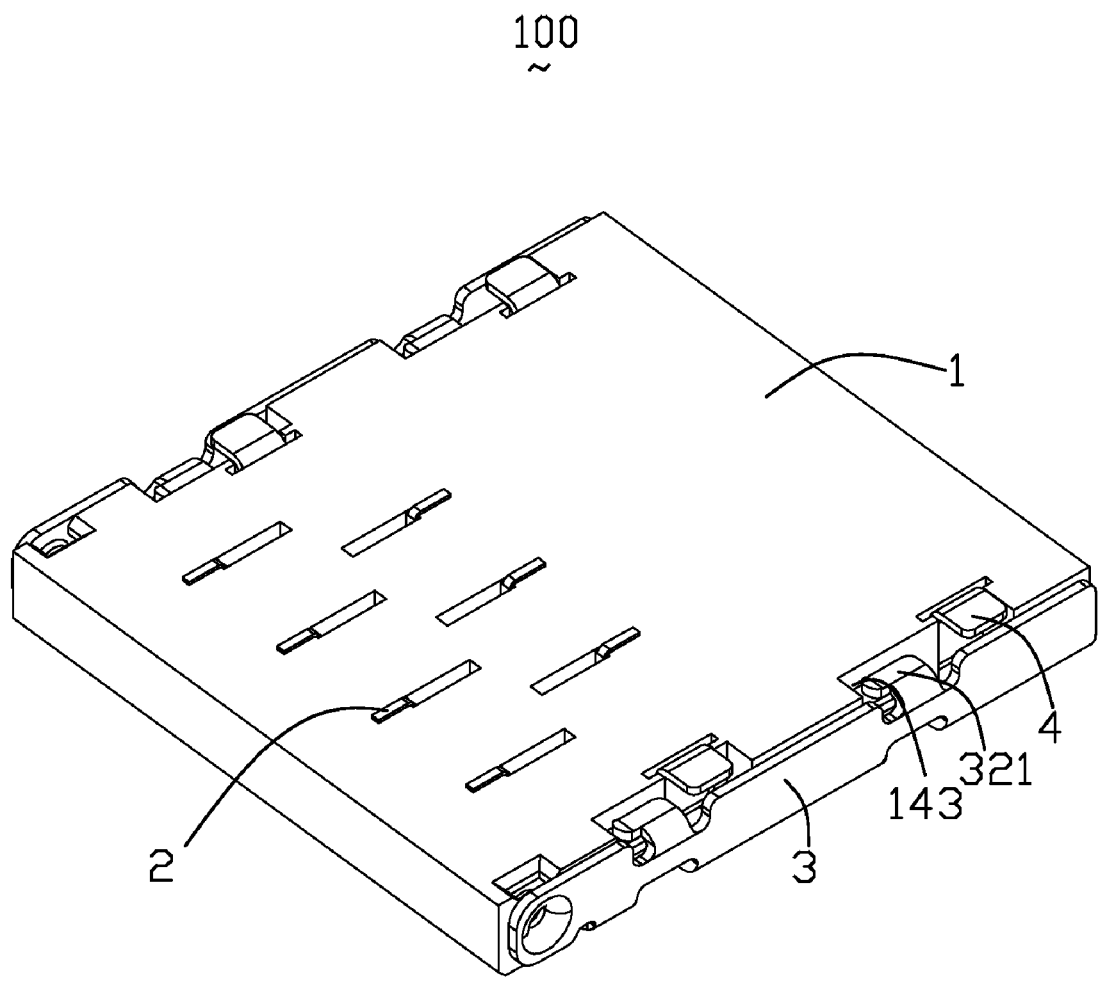
FIG. 4 is a bottom view of the socket connector as shown in FIG. 3.
Figure 5:
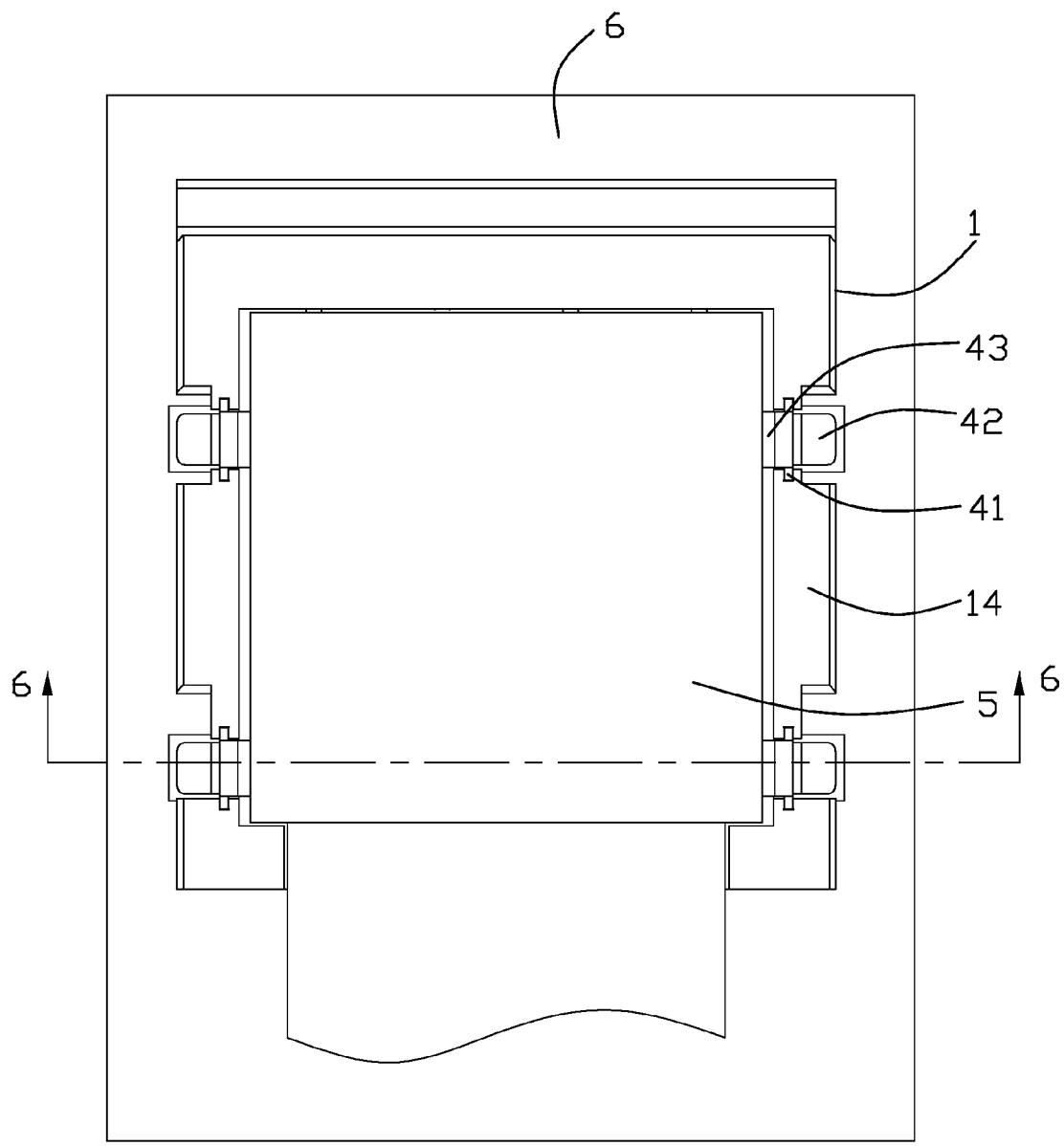
FIG. 5 is a top view illustrating an insulative housing of the socket connector mounted on a printed circuit board and receiving an electronic device therein.

FIG. 1 and FIG. 3 illustrates perspective views of the socket connector 100 made in accordance with the present invention, wherein a cover 3 thereof is rotationally disposed onto an insulative housing 1 and can be respectively disposed in an opened position and in a closed position. And FIG. 2 shows an exploded structure of the socket connector 100. Referring to FIG. 5, the socket connector 100 according to the present invention is generally mounted on a printed circuit board 6 for receiving an electronic device 5.

Referring to FIG. 1 to FIG. 3, the socket connector 100 includes an insulative housing 1, a plurality of contacts 2 disposed in the insulative housing 1, and a cover 3 pivotally connected to a front end of the insulative housing 2. When the cover 3 is located in the opened position as shown in FIG. 1, the electronic device 5 is able to be disposed therein. And when the cover 3 is rotated and positioned into the closed position, the electronic device 5 is locked within the socket connector 100.

Referring to FIGS. 1-6, the insulative housing 1 includes a mounting section 11 for mounting the cover 3 and a receiving section 12 for receiving the electronic device 5. A pair of sliding slots 13 is formed on two opposite ends of the mounting section 11. The receiving section 12 further includes a base 15 and a pair of sidewalls 14 located at opposite sides of the base 15. The base 15 and the sidewalls 14 jointly define a receiving space 151 for the electronic device 5. Each sidewall 14 is attached with two metallic and conductive positioning members 4, which is independent from each other and detachable from the insulative housing 1, if needed. The positioning member 4 includes a soldering section 42, a positioning section 43 and a retaining section 41 interconnecting the soldering section 42 and the positioning section 43. The retaining section 41 engages a retaining slot 141 formed on the sidewall 14 so that the positioning member 4 is attached therewith. The soldering section 42 is bent outwardly from the retaining section 41 to be soldered onto the printed circuit board 6. The positioning section 43 goes over the sidewall 14 via a top surface of the sidewall 14 and protrudes into the receiving space 151. The soldering section 152 is able to be electrically connected to a grounding trace in the printed circuit board 6. So the conductive positioning member 4 works as a bridge which drains a static electricity generated on the electronic device 5. The sidewall 14 is further featured with a recess 142 and a locking slot 143 communicated with the recess 142. The details of the recess 142 and the locking slot 143 will be described below. An inner surface 152 of the sidewall 14 is provided, upon which the positioning section 43 is covered. The contacts 2 consists of two groups, namely, the front contact 21 and the rear contacts 22, which are respectively retained in the base 15 via a row of front passageways 153 and a row of rear passageways 154. Each contact 2 has a contacting arm (not labeled) protruding into the receiving space 151. The insulative housing 1 has a rear end between the sidewalls defining an opening (not labeled) allowing the electronic device to pass through.

The cover 3 pivotally connected to the mounting section 11 of the insulative housing 1 and defines a cover plate 31 and a pair of side sheets 32 extending from opposite ends of the cover plate 31. A rectangular opening 33 is formed on the cover plate 31. A pair of shafts 34 is respectively formed on the front ends of the side sheets 32 and engage with the sliding slots 13 of the mounting section 11. Each side sheet 32 is featured with a latching member 321 which includes a bending section 3210, a stopping section 3211, and a guiding section 3212 at the end of the stopping section 3211. When the cover 3 is rotated from the opened position to the closed section, the latching member 321 firstly descends via the recess 142 on the sidewall 14 of the insulative housing 1, and then cover 3 is moved forwardly. Simultaneously, the shafts 34 slide in the sliding slots 13 of the insulative housing 1, and the stopping section 3211 moves into the locking slot 143. The section of the insulative housing 1 above the locking slot 143 constitutes a hard stop (not labeled) which engages with the stopping section 3211 of the latching member 321 so that the cover 3 is locked in the closed position.

Figure 6:
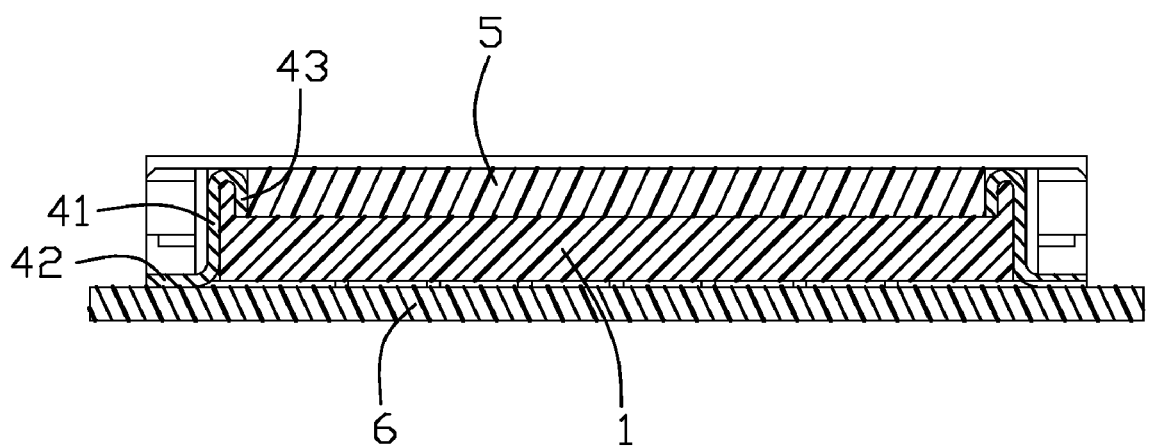
FIG. 6 is a cross sectional view taken along line 6-6 of FIG. 5.

Particularly referring to FIG. 5 and FIG. 6, when the electronic device 5 is received in the insulative housing 1, the positioning sections 43 of the positioning member 4 abut against the electronic device 5 which is thereby reliably positioned in predetermined position.

Although the present invention has been described with reference to particular embodiments, it is not to be construed as being limited thereto. Various alterations and modifications can be made to the embodiments without in any way departing from the scope or spirit of the present invention as defined in the appended claims.

What is claimed is:

1. A socket connector for receiving an electronic device, comprising:
   an insulative housing having a base and a pair of sidewalls located at opposite sides of the base, the base and the sidewalls jointly defining a receiving space for the electronic device;
   a plurality of contacts retained in the base; and
   at least one positioning member attached to the sidewall and comprising a soldering section capable of being soldered onto a printed circuit board on which the insulative housing is mounted, and a positioning section protruding into the receiving space and capable of positioning the electrical device,
   wherein the positioning section goes over the sidewall via a top surface of the sidewall,
   wherein the positioning member further comprises a retaining section engaged within a retaining slot formed in the sidewall and interconnecting the soldering section and the positioning section, wherein the insulative housing has a rear end between the sidewalls defining an opening allowing the electronic device to pass through and further comprising a cover pivotally connected to a front end of the insulative housing opposite to the rear end, the cover has two opposite side sheets respectively formed with a latching member, which engages a hard stop formed on the sidewall of the insulative housing, wherein each sidewall is featured with two said positioning members, wherein the contacts are arranged in two rows, and respectively have contacting arms extending into the receiving space.

2. A socket connector assembly mounted on a printed circuit board, comprising:
   an electronic device;
   an insulative housing having a base and a pair of sidewalls located at opposite sides of the base, the base and the sidewalls jointly defining a receiving space for accommodating the electronic device;
   a plurality of contacts retained in the base and electrically connected to the electronic device; and
   at least one conductive positioning member attached to the sidewall and electrically connected to a grounding trace on the printed circuit board, the positioning member having a positioning section positioning the electronic device so that a static electricity generated on the electronic device is drained via the conductive positioning member, wherein the positioning section goes over the sidewall via a top surface of the sidewall, wherein the positioning member further comprises a retaining section engaged within a retaining slot formed in the sidewall and a soldering section bent from the retaining section and soldered onto the printed circuit board, wherein the insulative housing has a rear end between the sidewalls defining an opening allowing the electronic device to pass through and further comprising a cover pivotally connected to a front end of the insulative housing opposite to the rear end, wherein the cover has two opposite side sheets respectively formed with a latching member, which engages a hard stop formed on the sidewall of the insulative housing, wherein the contacts are arranged in two rows, and respectively have contacting arms extending into the receiving space.

* * * * *